(12) United States Patent
Chuang

(10) Patent No.: US 6,651,710 B2
(45) Date of Patent: Nov. 25, 2003

(54) DUST-SUCKING AND POWER-DRIVING MOTOR

(76) Inventor: Bor Yann Chuang, No. 78, Yungfeng Rd., Taiping Shiang, Taichung (TW), 411

( * ) Notice: Subject to any disclaimer, the term of this patent is extended or adjusted under 35 U.S.C. 154(b) by 0 days.

(21) Appl. No.: 10/126,655

(22) Filed: Apr. 22, 2002

(65) Prior Publication Data

US 2003/0196725 A1 Oct. 23, 2003

(51) Int. Cl.[7] .............................................. B27G 19/00
(52) U.S. Cl. ................................ 144/252.1; 144/114.1; 144/117.1; 83/100; 15/415.1; 409/137
(58) Field of Search ............................. 144/252.1, 252.2, 144/117.1, 114.1; 83/100, 49; 15/415.1, 312.2, 314; 451/456; 409/137, 134

(56) References Cited

U.S. PATENT DOCUMENTS

| | | | | | |
|---|---|---|---|---|---|
| 396,934 | A | * | 1/1889 | Hutchinson | 144/243 |
| 1,954,465 | A | * | 4/1934 | Watson | 241/38 |
| 3,167,260 | A | * | 1/1965 | Gibbons et al. | 241/56 |
| 3,882,598 | A | * | 5/1975 | Earle et al. | 30/390 |
| 5,819,619 | A | * | 10/1998 | Miller et al. | 83/100 |
| 6,134,746 | A | * | 10/2000 | Miller et al. | 15/387 |
| 6,293,321 | B1 | * | 9/2001 | Chiang | 144/252.1 |
| 6,481,473 | B2 | * | 11/2002 | Liao et al. | 144/252.1 |

* cited by examiner

*Primary Examiner*—Allen Ostrager
*Assistant Examiner*—Shelley Self
(74) *Attorney, Agent, or Firm*—Troxell Law Office PLLC (57) ABSTRACT

A dust-sucking and power-driving motor has the opposite ends of a rotating shaft respectively formed into a wind-release driving portion connected with a wind-releasing device, and an operation driving portion connected with a carpentering machine, not only activating a blade fan of the wind-releasing device to rotate and carry on sucking scraps of wood, but also driving a carpentering machine to work.

3 Claims, 8 Drawing Sheets

DUST-SUCKING AND POWER-DRIVING MOTOR

BACKGROUND OF THE INVENTION

This invention relates to a dust sucking and power-driving motor, particularly to one simple in structure and having functions of sucking in and releasing out the scraps of wood being planed, and driving various carpentering machines to work at the same time.

Generally, when a conventional carpentering machine carries on planing, polishing and cutting of wood, the scraps of wood produced may scatter about and then drop down around the machine body, thus, polluting the air and soiling a working site and affecting one's health. Under such a condition, it has to take much time and labor to clean the working site with a cleaner after finishing work.

Another way of disposing the scraps of wood produced by planing is to have an electric dust collector provided additionally for sucking in the scraps of wood being planed by the driving power of the motor inside, only it increases cost to do so.

SUMMARY OF THE INVENTION

The objective of the invention is to offer a dust-sucking and power-driving motor having opposite ends of the motor shaft respectively formed in to a wind-releasing device for sucking in and releasing out dust and an operation driving portion connected with a belt wheel for driving a carpentering machine to work.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
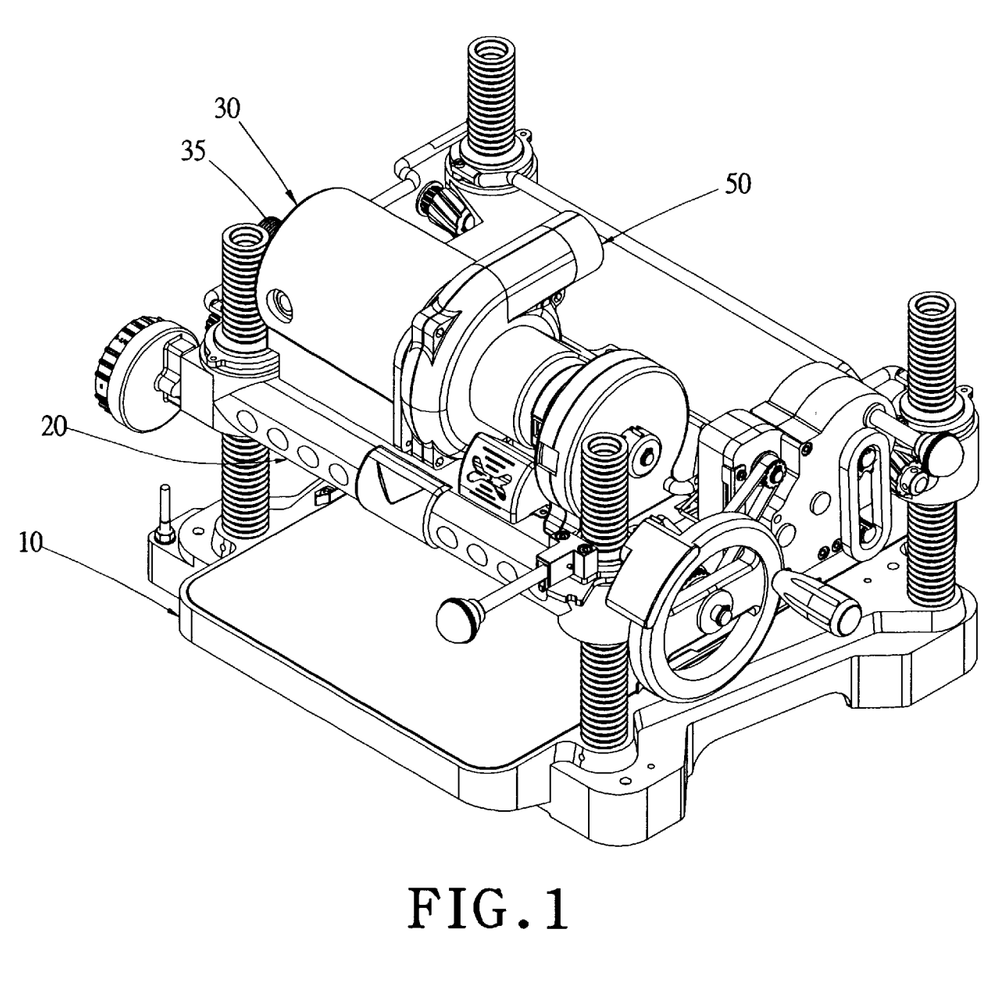
FIG. 1 is a perspective view of a dust-sucking and power-driving motor assembled on the machine base of a planer in the present invention.
Figure 2:
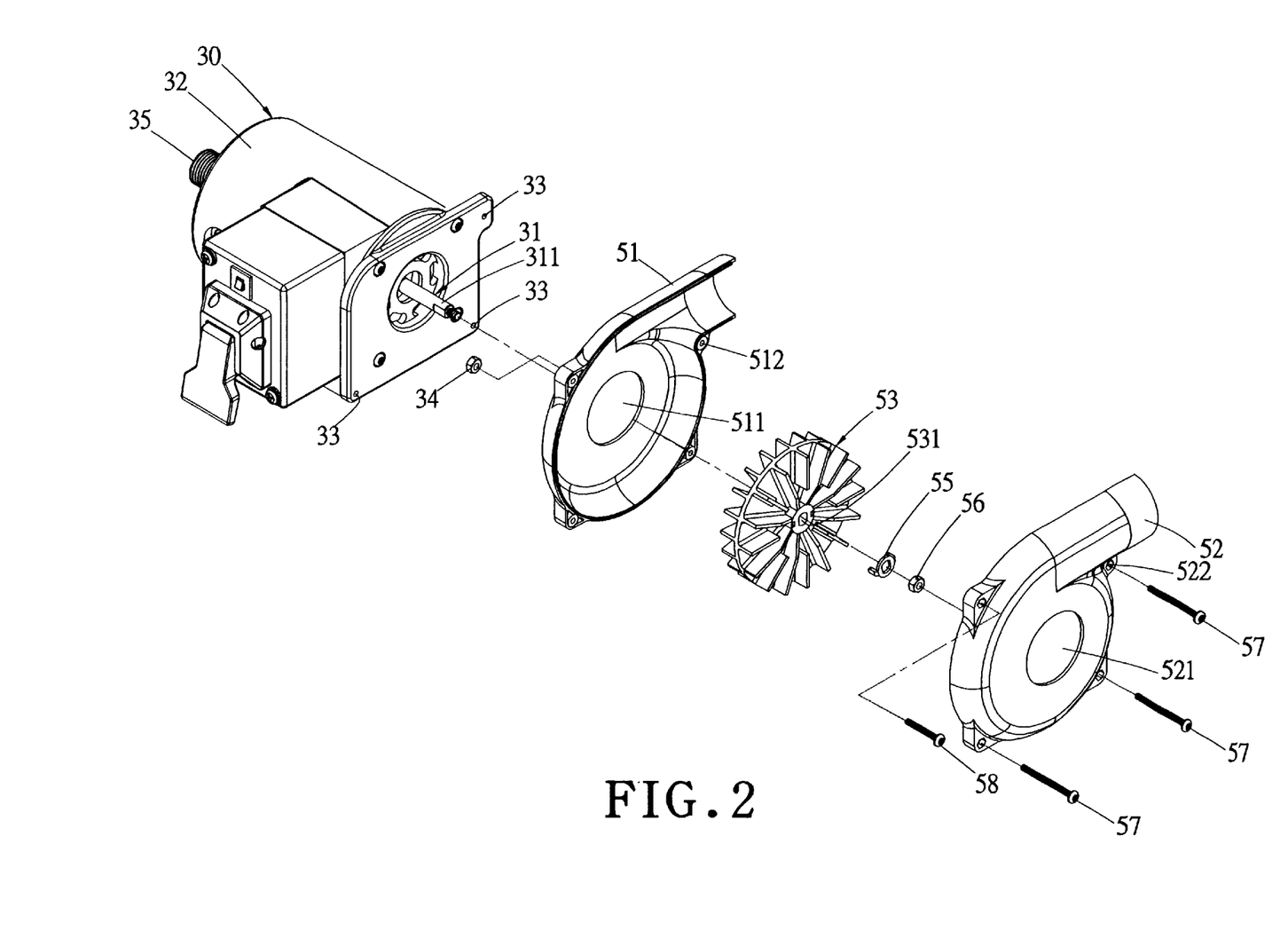
FIG. 2 is an exploded perspective view of the dust-sucking and power-driving motor in the present invention.
Figure 3:
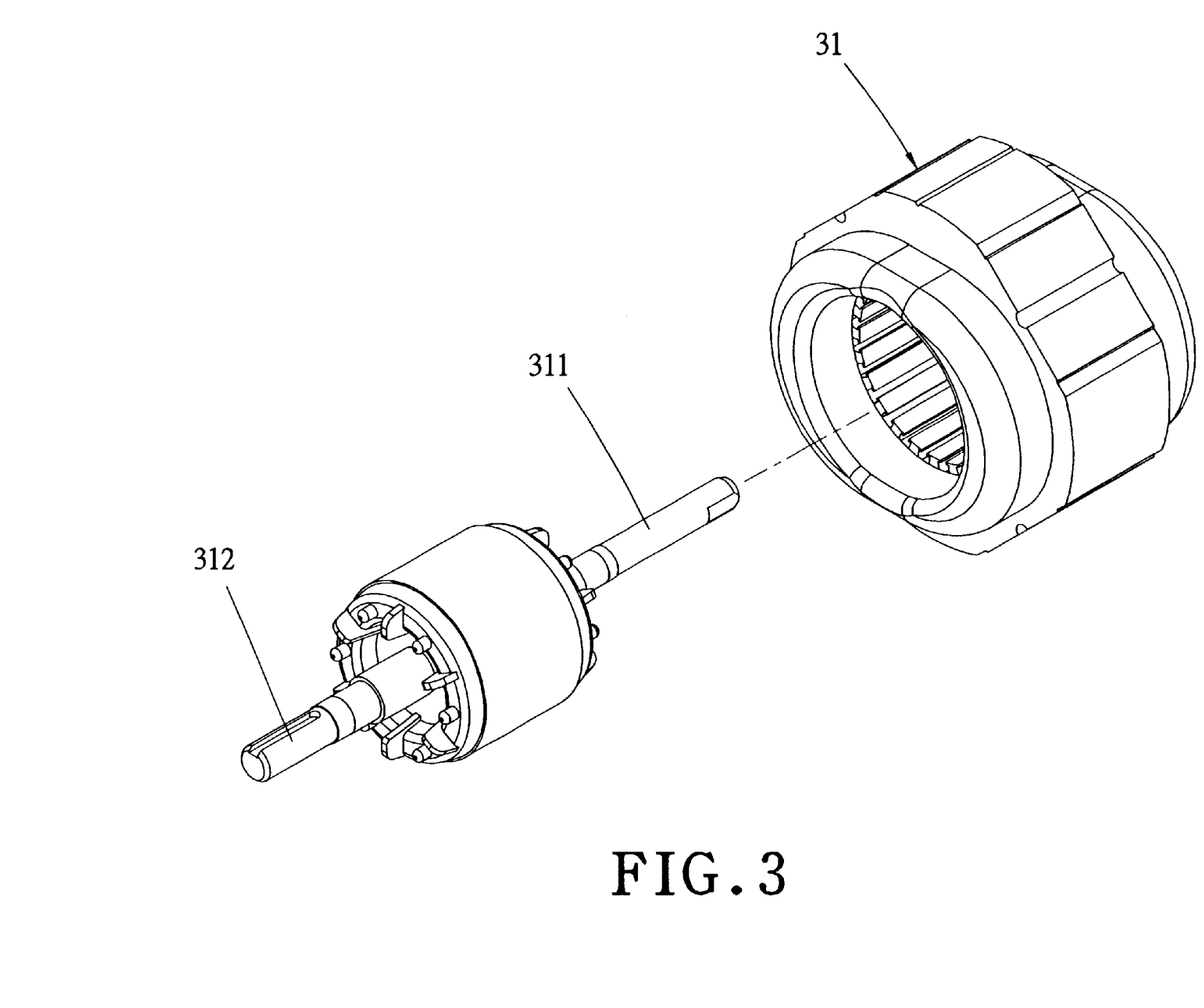
FIG. 3 is an exploded perspective view of the rotating shaft of the motor in the present invention.

A preferred embodiment of a dust-sucking and power-driving motor in the present invention applied to a planer, as shown in FIGS. 1, 2 and 3, includes a bottom base 10, a movable machine base 20 positioned on the bottom base 10, a motor 30 disposed on the machine base 20 and a wind-releasing device 50 provided behind the motor 30.

The motor 30 has a rotating shaft 31 fitted in the center, and the rotating shaft 31 has opposite ends protruding out of the housing 32 of the motor 30 and respectively forming a wind-release driving portion 311 and an operation driving portion 312, as shown in FIG. 2. The operation driving portion 312 is provided with a triangular belt wheel 35, as shown in FIG. 4, or with a plane belt wheel 36, as shown in FIG. 5, for transmitting and lifting a planer.

Figure 4:
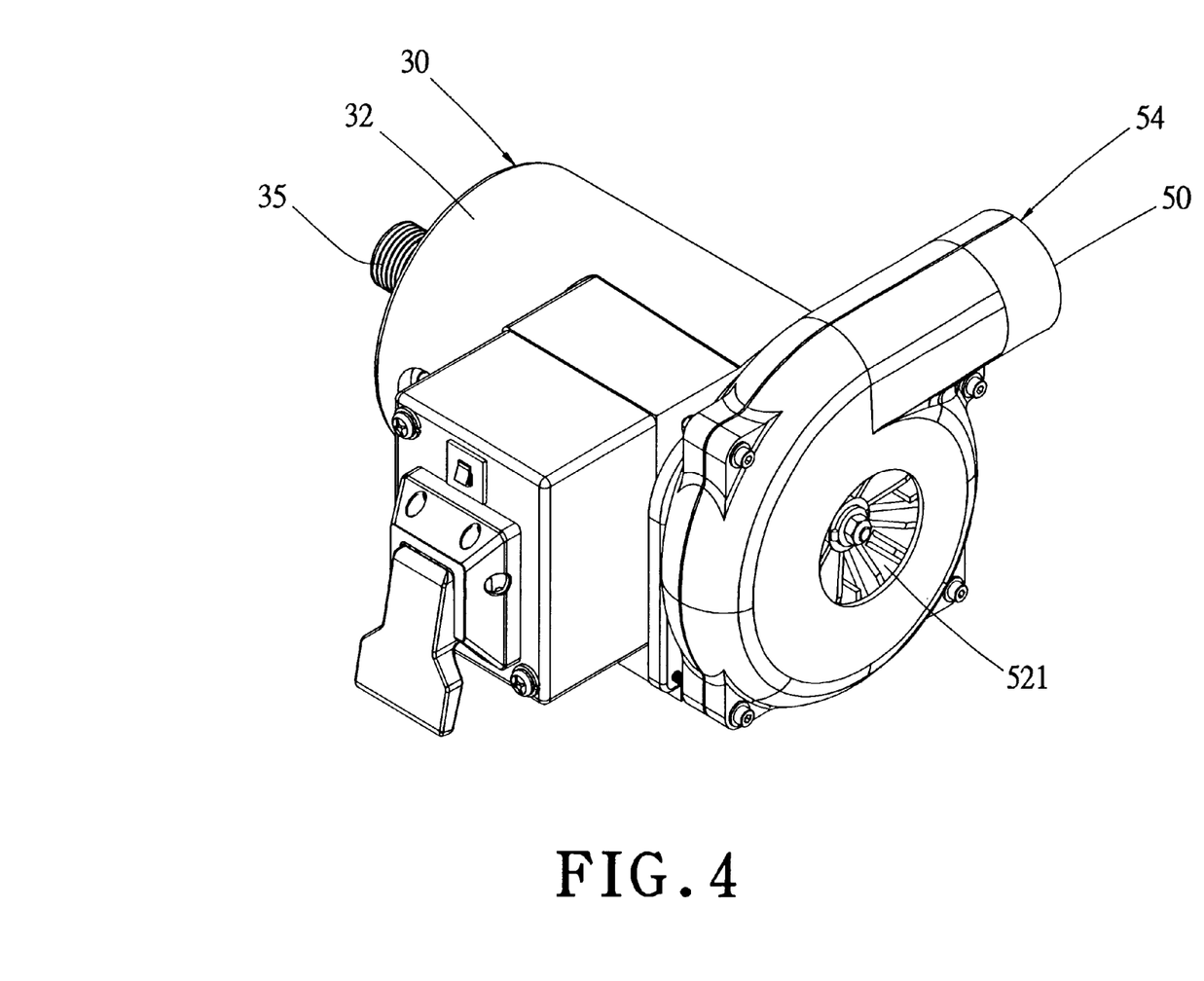
FIG. 4 is a side perspective view of the dust-sucking and power-driving motor in the present invention.
Figure 5:
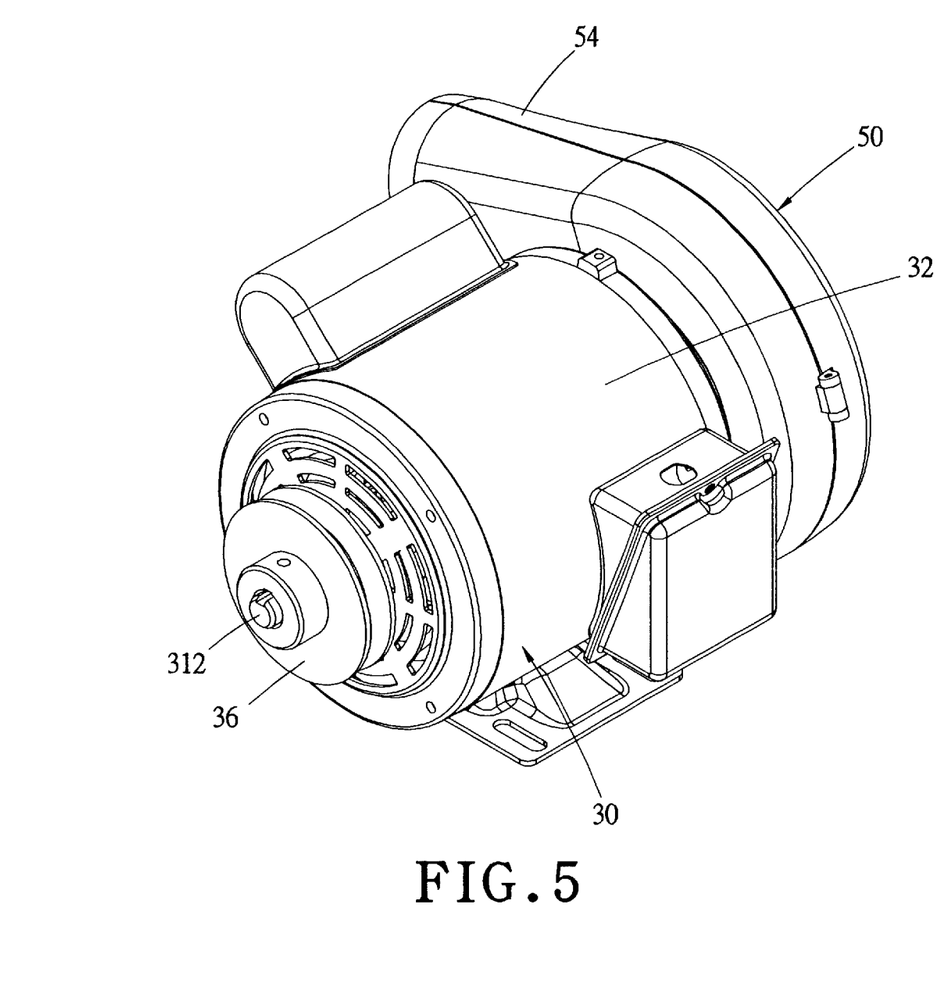
FIG. 5 is a rear perspective view of the dust-sucking and power-driving motor in the present invention.

The wind releasing device 50 provided behind the motor 30 is composed of a left wind-releasing pipe 51, a right wind-releasing pipe 52 and a blade fan 53, as shown in FIGS. 2 and 4.

The left wind-releasing pipe 51 has a wind intake hole 511 provided axially and threaded holes 512 of a preset number bored at predetermined locations.

The right wind-releasing pipe 52 has a scrap intake hole 521 provided axially and threaded holes 522 preset in number at predetermined positions.

The blade fan 53 with an axial through hole 531 is installed between the left and the right wind-releasing pipes 51 and 52, driven to rotate by the wind release driving portion 311 of the motor rotating shaft 31.

The left wind-releasing pipe 51 and the right wind-releasing pipe 52 are combined together and form a scrap-releasing hole 54 at a front end. Thus, scraps of wood being planed are sucked into the wind-releasing device 50 through the scrap intake hole 521 of the right wind-releasing pipe 52 and then released out through the scrap-releasing hole 54, as shown in FIG. 4.

In assembling, firstly, the wind intake hole 511 of the left wind-releasing pipe 51 is inserted through the wind release driving portion 311 of the motor rotating shaft 31, and then the blade fan 53 is positioned inside the left wind-releasing pipe 51 and has its axial through hole 531 fitted around the motor rotating shaft 31 and secured therein by means of a gasket 55 and a nut 56. Next, the right wind-releasing pipe 52 is fixedly combined with the left wind-releasing pipe 51 by bolts 57 screwing through the threaded holes 522 of the right wind-releasing pipe 52 and through the threaded holes 512 of the left wind-releasing pipe 51 and then into the threaded holes 33 of the motor 30 to be secured therein. Further, a relatively short bolt 58 is screwed through the threaded hole 522 of the right wind-releasing pipe 52 and the threaded hole 512 of the left wind-releasing pipe 51, and then fixed by a nut 34. Lastly, the assembled wind-releasing device 50 together with the motor 30 is disposed on the machine base 20.

In using, a dust-gathering pipe connected with a dust-gathering bag is fitted with the scrap-releasing hole 54 of the wind-releasing device 50. Thus, when the rotating shaft 31 of the motor 30 is rotating, the wind release driving portion 311 of the motor rotating shaft 31 drives the fan blade 53 of the wind-releasing device 50 to rotate and suck in planed wood scraps through the scrap intake hole 521 of the right wind-releasing pipe 52, and subsequently these scraps are released out of the scrap-releasing hole 54 and gathered in the dust-gathering bag through the dust-gathering pipe. By so designing, the wind-releasing device 50 of the invention can protect a user of a planer from inhaling planed wood scraps and also keep a work site clean.

As can be noted from the above description, this invention has the following advantages.

1. The motive power generated by the triangular belt wheel 35 and its belt of the operation driving portion 312 driving a planer lets the motor 30 have effects of sucking dust and driving the planer at the same time, requiring no additional motor. Besides, it is unnecessary to be provided in the motor 30 with a fan for radiating heat, because wind can get into the motor 30 through the wind intake hole 511 of the wind-releasing device 50, economizing producing cost.

2. The fan blade 53 of the wind-releasing device 50 is installed outside the motor 30 so the size of the blade fan 53 can be decided depending on practical requirements without any limits by the motor 30, that is, the larger the blade fan 53 is, the stronger the wind will be.

3. The wind-releasing device 50 positioned on the top of the machine base 20 is simple in structure and in assembly. Besides, the scrap-releasing hole 54 of the wind-releasing device 50 blows backward, not at all influencing the work of a user planning wood in front.

Figure 6:
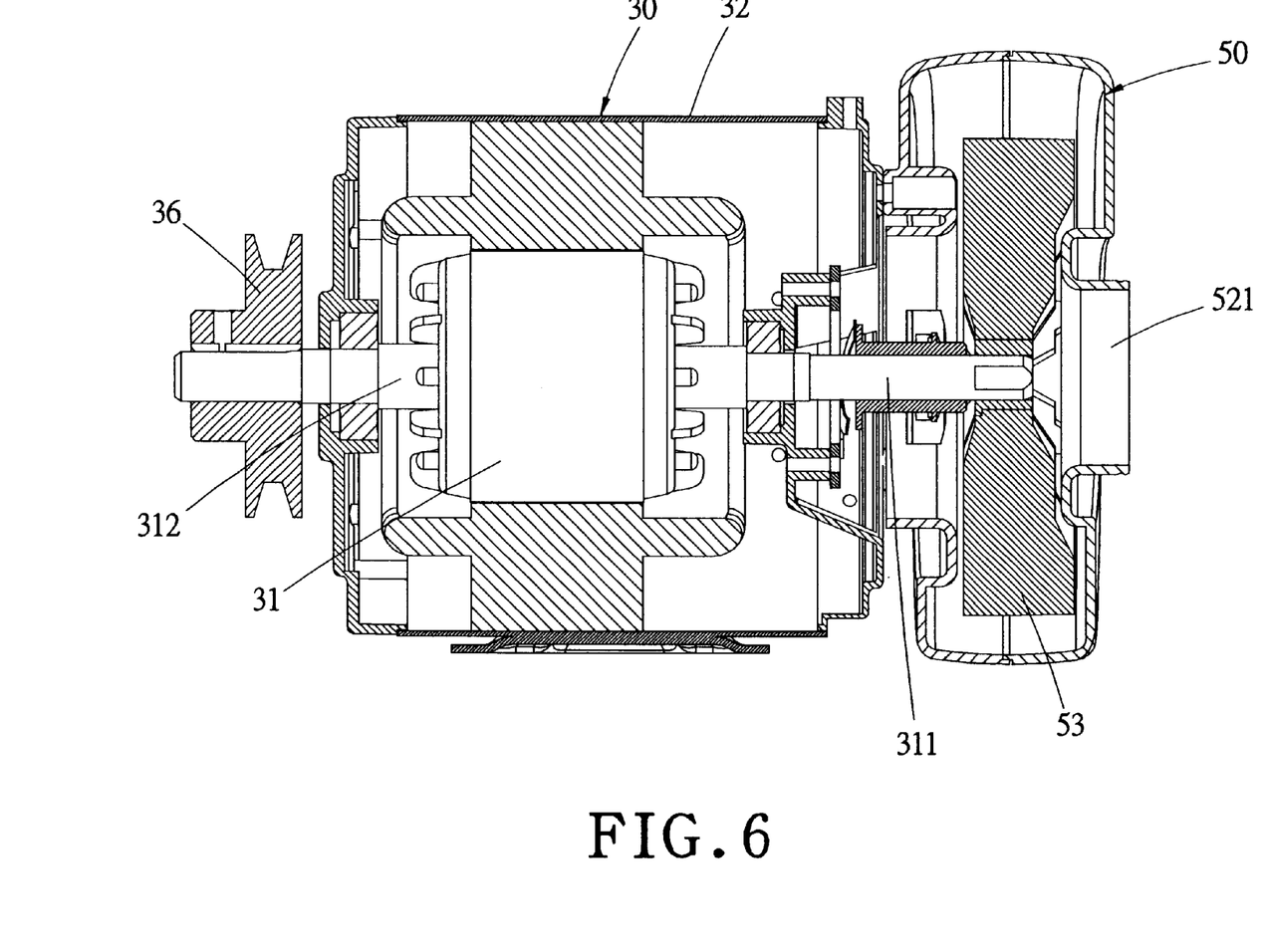
FIG. 6 is side cross-sectional view of the dust-sucking and power-driving motor in the present invention.

Further, FIGS. 5 and 6 show that the operation-driving portion 312 of the motor 30 is provided with a plane belt wheel 36 with a plane belt for driving another carpentering machine.

Figure 7:
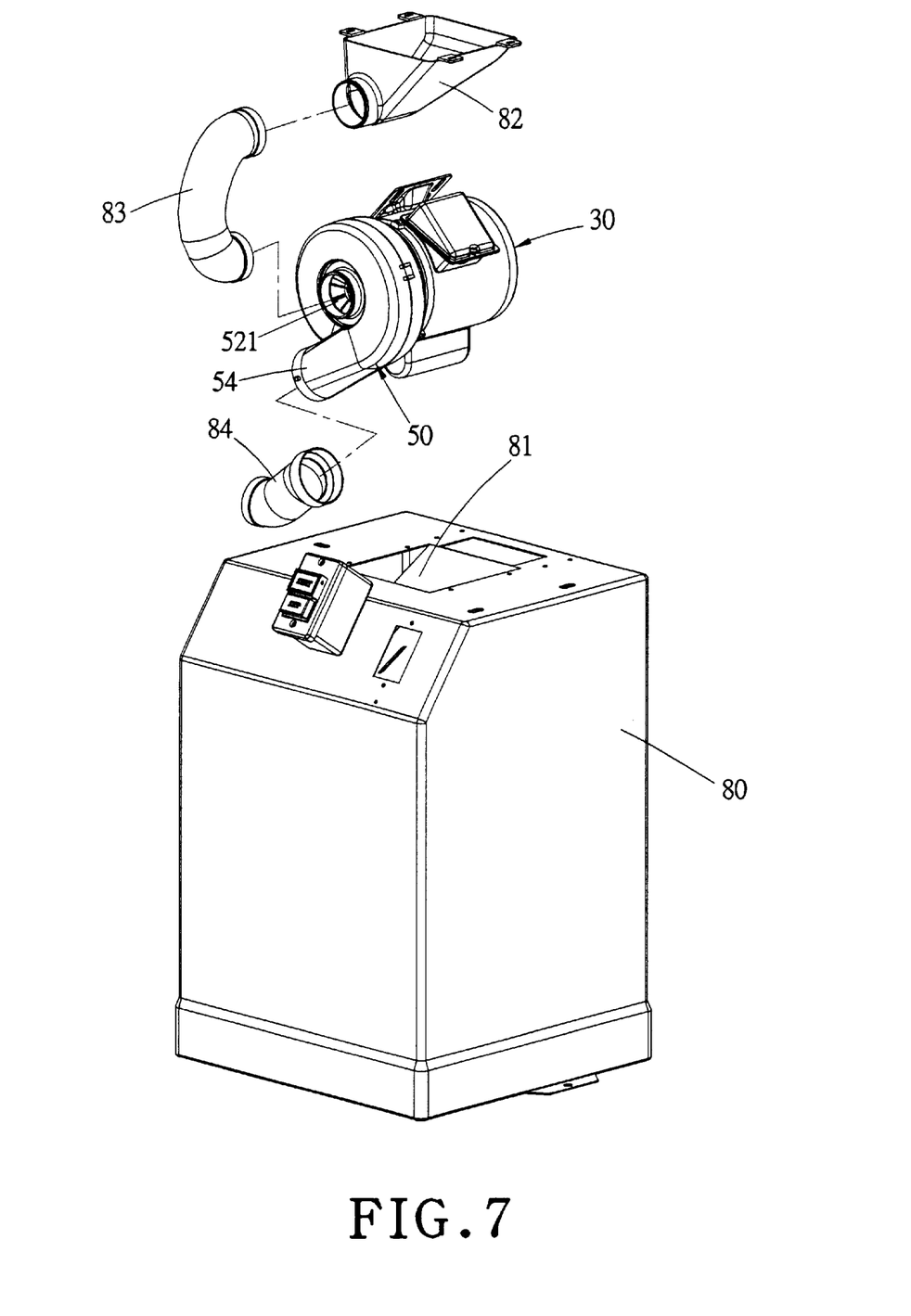
FIG. 7 is an exploded perspective view of the dust-sucking and power-driving motor to be assembled with a scrap-gathering box in the present invention.
Figure 8:
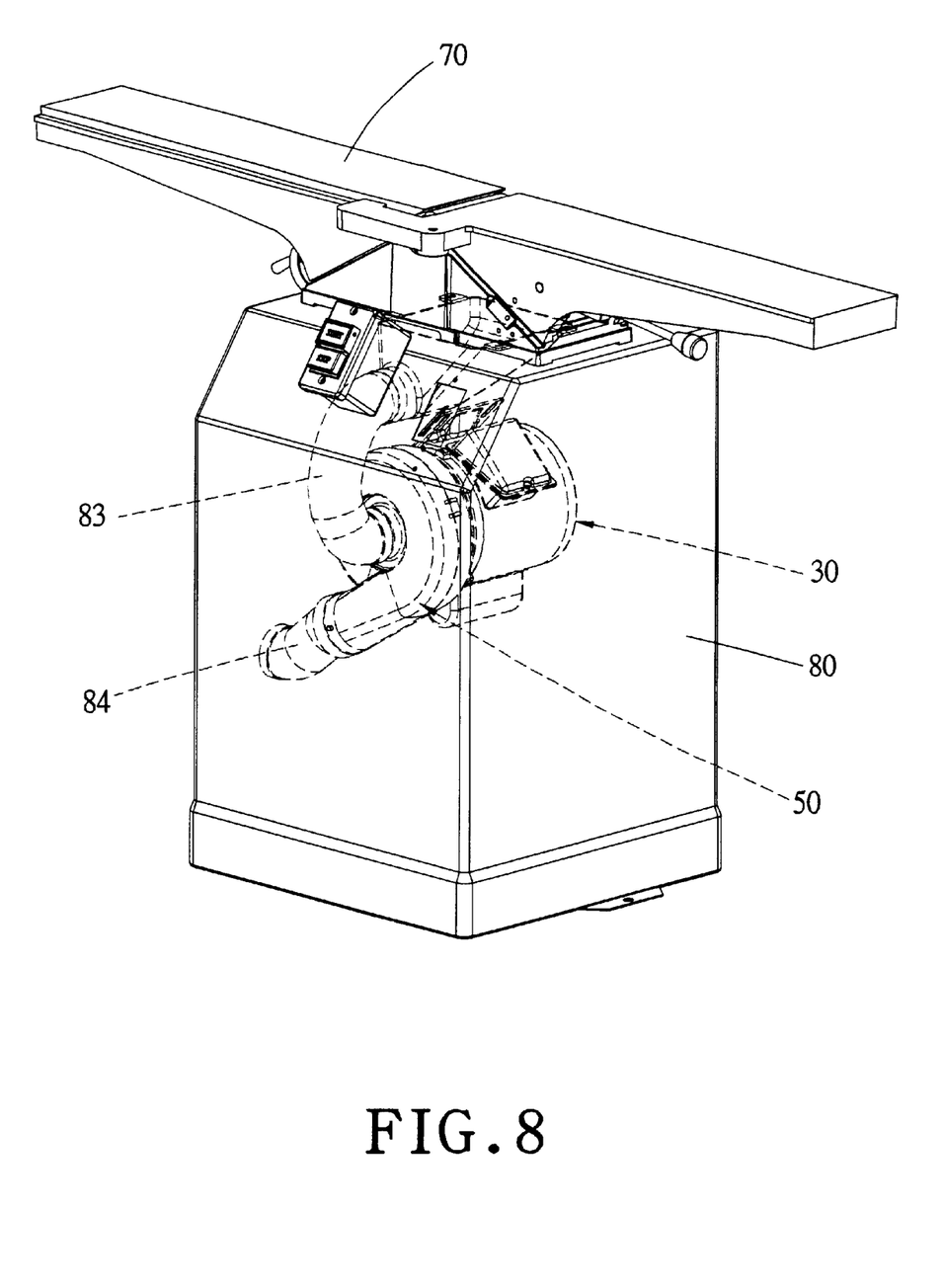
FIG. 8 is a perspective view of the dust-sucking and power-driving motor assembled with a hand planer in the present invention.

Aside from applying to a planer, the device of this invention can also be combined with a scrap-gathering box and with other kinds of carpentering machines for use such as a hand planer or the like, as shown in FIGS. 7 and 8. The hand planer 70 is provided at a lower side with a scrap-gathering box 80 having an opening 81 fitted with a scrap-gathering receiver 82 and a scrap intake pipe 83. The scrap sucking-in pipe 83 is connected with the scrap intake hole 521 of the wind-releasing device 50 of the motor 30, and a scrap-releasing pipe 84 is connected with the scrap-releasing hole 54 of the wind-releasing device 50 of the motor 30.

In using, the plane belt wheel 36 is fitted around with a belt for driving the hand planer 70. The scraps of wood produced in the process of planing directly drops into the scrap-gathering receiver 82, and are sucked into the scrap intake hole 521 of the wind-releasing device 50 through the scrap sucking-in pipe 83, and then are released into the scrap-gathering box 80 through the scrap-releasing hole 54 and the scrap-releasing pipe 84.

While the preferred embodiment of the invention has been description above, it will be recognized and understood that various modifications may be made therein and the appended claims are intended to cover all such modifications that may fall within the spirit and scope of the invention.

I claim:

1. A dust sucking and power-driving motor comprising:

a motor having a rotating shaft, said rotating shaft having opposite ends respectively protruding out of a housing of said motor, one of said opposite ends formed into a wind release driving portion, and the other formed into an operation driving portion; and a wind-releasing device having a left wind-releasing pipe, a right wind-releasing pipe and a blade fan, said left wind-releasing pipe provided axially with a wind intake hole and having threaded holes of a preset number bored at predetermined positions, said right wind-releasing pipe provided axially with a said scrap intake hole and having threaded holes of a preset number formed at predetermined locations, said blade fan provided axially with a through hole, said blade fan positioned between said left wind-releasing pipe and said right wind-releasing pipe, said blade fan driven by said wind release driving portion of said rotating shaft of said motor, said scrap releasing hole formed at the front end of said left wind-releasing pipe and said right wind-releasing pipe after they are combined together, planed wood scraps being sucked into said wind-releasing device through said scrap intake hole of said right wind-releasing pipe, said scraps of wood being released out of said wind-releasing device through scrap-releasing hole.

2. The dust-sucking and power-driving motor as claimed in claim 1, wherein said operation driving portion of said motor is provided with a triangular belt wheel.

3. The dust-sucking and power-driving motor as claimed in claim 1, wherein said operation driving portion of said motor is provided with a plane belt wheel.

* * * * *